United States Patent Office 3,396,116
Patented Aug. 6, 1968

3,396,116
ENCAPSULATION TECHNIQUE
Leon M. Adams and Clarke E. Schuetze, San Antonio, Tex., assignors, by mesne assignments, to AMP Incorporated, Harrisburg, Pa., a corporation of New York
No Drawing. Filed Sept. 7, 1965, Ser. No. 485,558
8 Claims. (Cl. 252—182)

ABSTRACT OF THE DISCLOSURE

A water-insoluble alginate salt capsule filled with an aliphatic amine curing agent for epoxy resins, said amine being admixed with a mono- or di-alkyl monophenol and a polyhydric phenol.

---

This invention relates to improved methods for encapsulating certain reactive materials, and to capsules containing such materials. In particular, the invention relates to the encapsulation of reactive substances useful for curing or hardening epoxy resins, and to the capsules containing such substances.

U.S. Patent 3,015,128 to Somerville discloses an apparatus and techniques for enclosing a filler material, either liquid or solid, in a continuous surrounding film of an encapsulating medium. According to the technique there disclosed, the material to be encapsulated is centrifugally projected through a thin film of the encapsulating material. The capsules formed by passage of the filler material through a film of the encapsulating medium are then suitably hardened by contact with a substance reactive with the film-forming encapsulating medium to form an impermeable envelope around the filler.

Other techniques for encapsulation are disclosed in patents such as U.S. 2,766,478 to Raley and U.S. 2,275,154 to Merrill, for example. In the apparatus and techniques discussed in the last-mentioned patent, gravitational forces are relied upon to cause the formation of a capsule by passage of a filler through a thin film of the encapsulating medium.

These encapsulation methods are particularly amenable to the use, as film forming materials, of aqueous suspensions of water-soluble alginate salts, such as sodium, potassium, and ammonium alginates. These salts form viscous colloidal solutions in water, and react with calcium ion to form insoluble calcium alginate. By contacting capsules having a film of a soluble alginate as the shell with a bath containing dissolved calcium ions, a hardened calcium alginate shell wall is formed.

Other water-soluble film-forming materials may be combined with a soluble alginate to modify the properties of the resulting shell wall. For example, polyvinyl alcohols and gelatin have been used in combinaion with soluble alginates as encapsulating media. In certain cases, these materials may be used alone as the component of the shell wall.

Although such prior art techniques have proved adequate for the encapsulation of relatively inert materials, they are not entirely satisfactory for forming capsules containing highly chemically active substances. Chemically reactive materials, by permeation or attack of the capsule shell walls, tend to escape from capsules in which they are present as fill materials, thus defeating the purposes of encapsulation.

This has proved particularly true when attempting to encapsulate highly reactive hardeners or curing agents capable of curing epoxy resins. The encapsulation of one or both components of epoxy resin systems comprising a fluid epoxy resin and a hardener or curing agent therefor has been suggested in British Patent 765,082, for example. The prior art suggests that such encapsulated systems would be stable until rupture of the capsules permitted chemical interaction of the resin and hardener. However, the hardeners, such as amines, are very fugitive substances, and tend to escape the capsules either during the capsule forming process or after formation, but prior to crushing of the capsule shell wall.

According to the present invention, it has been found that the incorporation of small amounts of a polyhydric phenol with a chemically active filler material, particularly with an amine curing agent capable of curing epoxy resins, decreases the loss of amine curing agent through the surrounding shell wall materials.

The amines used for the curing of epoxy resins are well known to the art, and are discussed in detail, for example, in chapters 3 and 4, incorporated herein by reference, of "Epoxy Resins, Their Applications and Technology," by Lee and Neville, McGraw-Hill Book Company, Inc. New York (1957). As discussed in these chapters, a variety of aliphatic amines having primary amino groups are employed as hardeners. The aliphatic amines may be combined in a variety of proportions to produce amine blends. Similarly, cyclic aliphatic amines, tertiary amines, tertiary amine salts, and aromatic amines can be employed for hardening epoxy resins.

The amines can be altered by reaction with ethylene oxide, by cyanoethylation, or by reaction with materials containing glycidyl groups. Commonly owned copending patent application Ser. No. 485,557, filed on even date herewith and incorporated herein by reference, teaches improved techniques for encapsulating amine curing agents for epoxy resins by combining the amines to be encapsulated with from about 30 to about 80 percent of an alkyl monophenol, by weight of the resulting mixture. As discussed in said copending application, the best capsules have been obtained by combining one or more water-insoluble alkyl substituted monophenols having one or more alkyl side chains each having from 6 to 12 carbon atoms, preferably from 7 to 10 carbon atoms, with an amine curing agent for epoxies. Typical suitable alkyl monophenols include octyl phenol, di-octyl phenol, nonyl phenol, and di-nonyl phenol. Particularly good results have been obtained when alkyl phenols are combined with one or more polyalkylene polyamines of the formula.

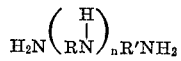

where $n$ is an integer from 1 to 3 and R and R' are each lower alkylene, or with an N-aminoalkyl piperazine such as N-aminoethyl piperazine, or with mixtures of such polyamines and piperazines. Examples of polyalkylene polyamines are diethylenetriamine, triethylenetetramine, and tetraethylene pentamine.

According to the present invention, the addition of a polyhydric phenol to such combinations gives still greater improvement in the properties, particularly the shelf life, of capsules formed with such amine-containing mixtures as the fill material.

In such mixtures, the polyhydric phenol may be present in amounts up to about 10 percent by weight of the mixture. The presence of even small amounts, as low as 1 percent, of polyhydric phenol in the fill results in decreased loss of amine from the capsules. Although amounts of polyhydric phenol greater than about 10 percent are not desirable per se, they do bring about a dilution of the amine fill, and the amount polyhydric phenol present is preferably kept low. Excellent results have been obtained with amounts of phenol of from about 2 percent to about 5 percent, for example. The polyhydric phenols of greatest commercial interest are the dihydroxy benzenes and alkyl substituted dihydroxy benzenes.

These mixtures are conveniently encapsulated within a shell wall comprising soluble alginates alone or in combination with polyvinyl alcohol, polyethylene oxide polymers, acrylic polymers, and/or with gelatin.

In aqueous suspensions of these materials which are prepared for the purpose of encapsulation, the content of alginate and other solids present is preferably between about 5 to 10 percent by weight. Since hardening of the capsule shell wall is primarily effected by conversion of water-soluble alginates to insoluble substances, at least about 40 to 50 percent by weight of the solids present in the aqueous suspension are preferably alginate materials. If the percentage of non-alginate solids exceeds more than about 60 percent by weight of the total solids content of the suspension, difficulty may be had in drying the resulting capsule materials by conventional techniques. However, where excess moisture can be removed by the use of solid dessicants or the like, smaller quantities of alginate in the shell wall-forming solution may be employed. When gelatin is present in the shell wall solutions, it is preferably present in amounts less than about 1 percent by weight of the solution. Larger amounts of gelatin tend to cause stringing of the shell wall solution, rendering it less adaptable to use in the encapsulation processes described.

Although the nature and properties of the shell wall-forming solution may vary depending on the size of the capsule to be produced, the material to be encapsulated, and specific techniques of capsule formation, the solutions employed in forming the capsule shell wall generally have a viscosity at 25° C. between about 2 stokes and about 35 stokes. However, operation is usually in a narrower range between about 2 and about 10 stokes, and best results are usually obtained when the viscosity of the solution is between about 3 and about 7 stokes.

The production of capsules of a size between 250 microns and 1500 microns is of greatest interest from the point of view of practical application, but still larger or smaller particles, up to 2500 microns or as small as 100 microns, can be made by appropriate variation of the encapsulating techniques as described in the prior art.

The shell wall solutions described above may contain optional preservative agents for organic materials, such as the alginates, which may be subject to bacterial degradation. Such preservative materials are well known in the art, and include materials such as sodium benzoate, formaldehyde, the alkyl esters of p-hydroxy benzoic acid, mercurials, and the like. These preservatives may be present in amounts of up to 0.1 percent or 0.2 percent by weight of the solution.

Additionally, optional surfactant materials may be present in the shell wall forming solution to modify its viscosity or flow properties. Non-ionic and anionic surface active agents have been added in amounts of about 3 mls. per 1000 grams of suspension, for example.

A particularly suitable mixture for the formation of shell walls is a solution or suspension comprising five percent by weight of sodium alginate ("XRA–10"), 3 percent by weight of polyvinyl alcohol ("Elvinol 70–05"), and from 0.5–1.0 percent by weight of gelatin (150 or 300 bloom). Although the grade of gelatin specified above is of a particular viscosity, materials giving more viscous solutions on dispersion in water can be employed in smaller quantities. To maintain the desirable solids content of the resulting dispersion, the amount of polyvinyl alcohol or alginate is then raised correspondingly. The polyvinyl alcohol indicated above is one which is substantially completely hydrolyzed. A high degree of hydrolysis in the polyvinyl alcohol is preferred, since hydrolyzed materials are less soluble in the organic substances used as fill in the capsules.

Other typical shell wall formulations are given below (all percentages are by weight):

(A)

| | |
|---|---|
| Soluble alginate _____percent__ | 2.75 |
| Polyvinyl alcohol _____ | 2.00 |
| Gelatin _____ | 1.00 |
| Water _____ | 94.25 |

(B)

| | |
|---|---|
| Soluble alginate _____percent__ | 5.50 |
| Gelatin _____ | 0.55 |
| Water _____ | 93.95 |

(C)

| | |
|---|---|
| Soluble alginate _____percent__ | 5.24 |
| Polyethylene oxide ("Polyox WSR35") _____ | 0.42 |
| Water _____ | 94.34 |

(D)

| | |
|---|---|
| Soluble alginate _____percent__ | 5.24 |
| Acrylic polymer ("Cyanamer P–26") _____ | 0.42 |
| Water _____ | 94.34 |

All of the compositions may be modified by the addition of minor amounts of surface active agents and/or preservatives.

Prior art techniques for producing multi-walled capsules can also be adapted to the present invention. U.S. Patent No. 2,379,817 to Mabbs, for example, teaches methods and apparatus for making multi-walled capsules by extrusion techniques using devices with a plurality of concentric orifices. Suitably, the outer shell comprises a hardenable alginate composition, while the inner shell comprises a material highly resistant to permeation by the encapsulated fill.

A better understanding of the present invention and of its many advantages will be had by referring to the following specific examples given by way of illustration.

Example 1

A mixture comprising 40.3 percent by weight of N-aminomethyl piperazine, 56.7 percent by weight of nonyl phenol, and 3 percent of resorcinol was encapsulated by extrusion techniques using a shell wall-forming solution comprising 5.25 percent by weight of sodium alginate, 0.42 percent by weight of an acrylic polymer ("Cyanamer P–26"), and 94.33 percent of distilled water. The capsules were projected into a hardening bath of aqueous calcium chloride solution and air dried. The dried capsules had a fill of 56.3 percent by weight of the capsule, of which 35.5 percent was amine.

The capsule formation was repeated using a mixture of 48.3 percent by weight of the same amine with 51.7 percent of alkyl phenol. No resorcinol was present. In the resulting capsules, the fill was 53.3 percent, and which 29.0 percent by weight was amine.

Example 2

Using a shell wall solution comprising 5.0 percent of alginate, 3.5 percent of polyvinyl alcohol, 0.5 percent of gelatin, and 91.0 percent of distilled water, a mixture of 41.0 percent of N-aminoethyl piperazine, 58.0 percent of nonyl phenol, and 1.0 percent of resorcinol was encapsulated. The dried capsules had a fill of 56.7 percent by weight, of which 23.1 percent was amine.

By increasing the amount of resorcinol in the encapsulating mixture 4.0 percent (the amine comprised 42.6 percent by weight and the alkyl phenol 53.4 percent by weight of the mixture) a fill of 52.8 percent was obtained, of which 33.2 percent was active amine.

Example 3

Using the same shell wall solution as for Example 2, a mixture of 40.3 percent of N-aminoethyl piperazine, 56.7 percent of an alkyl phenol, and 3.0 percent of 4-t-octylcatechol was encapsulated. The dried capsules had a fill of 57.1 percent, of which 31.0 percent was amine.

Example 4

A solution comprising 40.3 percent of N-aminoethyl piperazine, 56.7 percent of alkyl phenol, and 3.0 percent of 3-methylcatechol was encapsulated. The dried capsules had a fill of 54.5 percent, of which 32.1 percent was amine.

Example 5

A mixture of 40.3 percent N-aminoethyl piperazine, 56.7 percent of alkyl phenol, and 3.0 percent of 4-methylcatechol was encapsulated. The dried capsules had a fill of 57.8 percent, of which 29.3 percent was amine.

Example 6

A mixture of 40.3 percent of N-aminoethyl piperazine, 56.7 percent of alkyl phenol, and 3.0 percent of hydroquinone was encapsulated. The dried capsules had a fill content of 56.7 percent, of which 32.5 percent was amine.

Example 7

An amine-alkyl phenol mixture as in Example 6, but containing 3.0 percent of catechol in place of the hydroquinone, was encapsulated. The dried capsules had a fill of 52.9 percent, of which 32.5 percent was amine.

Example 8

A mixture consisting of 17.9 percent of N-aminoethyl piperazine, 36.0 percent of diethylene triamine, 44.1 percent of nonyl phenol, and 2 percent of hydroquinone was encapsulated, using a shell wall solution comprising 4.5 percent of sodium alginate, 2.0 percent of polyvinyl alcohol, 1.0 percent of 150 bloom gelatin, and water to make 100 parts. The resulting capsules, which were 500–600 microns in size, had a fill of 51.3 percent, of which 40.6 percent was amine.

Example 9

A mixture of 58.8 parts of diethylene triamine, 39.2 parts of nonyl phenol, and 2 parts, by weight, of hydroquinone was encapsulated, as in Example 8. The resulting capsules, which were 500–600 microns in size, had a fill of 43.8 percent, of which 45.7 percent was amine.

What is claimed is:

1. A capsule consisting essentially of (A) at least one amine curing agent selected from the group consisting of an N-aminoalkyl piperazine and a polyalkylene polyamine of the formula

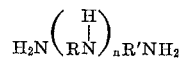

wherein $n$ is an integer from 1 to 3 and R and R′ are each lower alkylene, in admixture with from about 30 percent to about 80 percent of an alkyl monophenol having up to two alkyl side chains each having from 6 to 12 carbon atoms, and with from about 1 percent to about 10 percent of a polyhydric phenol, the percentages being by weight of the mixture, and (B) a continuous surrounding shell wall envelope consisting essentially of a water-insoluble alginate salt.

2. A capsule as in claim 1 wherein said polyhydric phenols is a member selected from the group consisting of dihydroxy benzenes and alkyl substituted dihydroxy benzenes.

3. A capsule as in claim 1 wherein said amine is diethylene triamine.

4. A capsule as in claim 1 wherein said amine is triethylene tetramine.

5. A capsule as in claim 1 wherein said amine is tetraethylene pentamine.

6. A capsule as in claim 1 wherein said amine is N-aminoethyl piperazine.

7. A capsule as in claim 1 wherein said amine is a mixture of diethylene triamine and N-aminoethyl piperazine.

8. A capsule as in claim 1 wherein said alkyl monophenol is selected from the group consisting of octyl phenol, di-octyl phenol, nonyl phenol, and dinonyl phenol.

References Cited

UNITED STATES PATENTS 2,800,458   7/1953   Green _____ 252—316

LEON D. ROSDOL, *Primary Examiner.*

S. D. SCHWARTZ, *Assistant Examiner.*